Jan. 18, 1927. 1,615,067

J. BOERMAN

INSPECTION LIGHT

Filed April 15, 1926

Inventor
Jacob Boerman
By Frank E. Liverance, Jr.
Attorney

Patented Jan. 18, 1927.

1,615,067

UNITED STATES PATENT OFFICE.

JACOB BOERMAN, OF GRAND RAPIDS, MICHIGAN.

INSPECTION LIGHT.

Application filed April 15, 1926. Serial No. 102,151.

This invention relates to novel improvements in connection with spectacle lights and is particularly concerned with a novel electric light mounting for spectacles or goggles which may be cheaply and economically manufactured and which is mounted between the two lenses of spectacles or like articles. One of the objects and purposes of the present invention is to provide a device of this character wherein the electric light bulb may be mounted for a universal movement in order that its light may be directed to any place desired. A further object of the invention is to embed electric wire connections in one of the bows of the spectacles and in the frame around one of the lenses so that the light may be supplied with current from any suitable light socket, there being provided means in the end of said bow whereby a connection may be made by a drop cord between the light socket and the end of the bow. Many other objects and purposes than those stated, particularly in the simple and effective means whereby not only may an electric light bulb be replaced should it burn out or otherwise become defective, but the mounting therefor also replaced, will be apparent together with novel details of construction for effecting such objects as understanding of the invention is had from the following description taken in connection with the accompanying drawing, in which—

Like reference characters refer to like parts in the different figures of the drawing.

Figure 1:
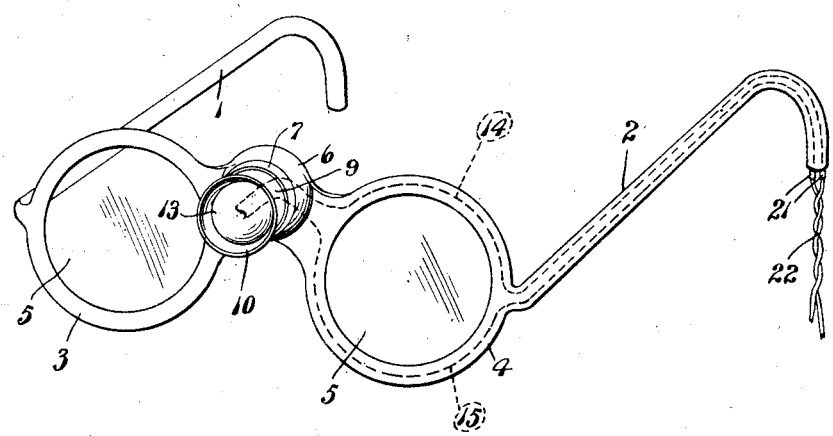
Fig. 1 is a perspective view of spectacles equipped with the electric light of my invention.

The spectacle frame includes bowls 1 and 2 which are connected with the circular lens holding members 3 and 4 of the frame, any type of lens indicated at 5 being mounted in said circular portions 3 and 4. The said portions 3 and 4 are connected by the usual bridge which is formed at its central portion with an enlargement 6 through an opening is made. An outer part of this opening is interiorly threaded so as to receive a metal socket 7 which may be screwed thereinto. Socket 7 is of a shape that it may receive and mount a substantially ball-like mounting 9 from which a reflector 10 of the shape best shown in Fig. 2, extends forwardly. It is evident that this member 9 and the reflector and the parts mounted thereon is capable of universal movement about a center which permits the same to be turned in any desired direction. The ball-like member 9 has an opening entirely through it which is interiorly threaded so that it may receive the metal shell 11, the inner end of which is filled with any suitable plug 12 of insulation material, the electric light bulb 13 being at the outer end of the shell and located within the reflector 10. The filament of the bulb has one wire connected with a cylindrical metal socket member 12$^a$ inserted in the inner end of the plug 12 while the other wire is connected with the metal member 11 as usual in electric light mountings of this character.

Figure 2:
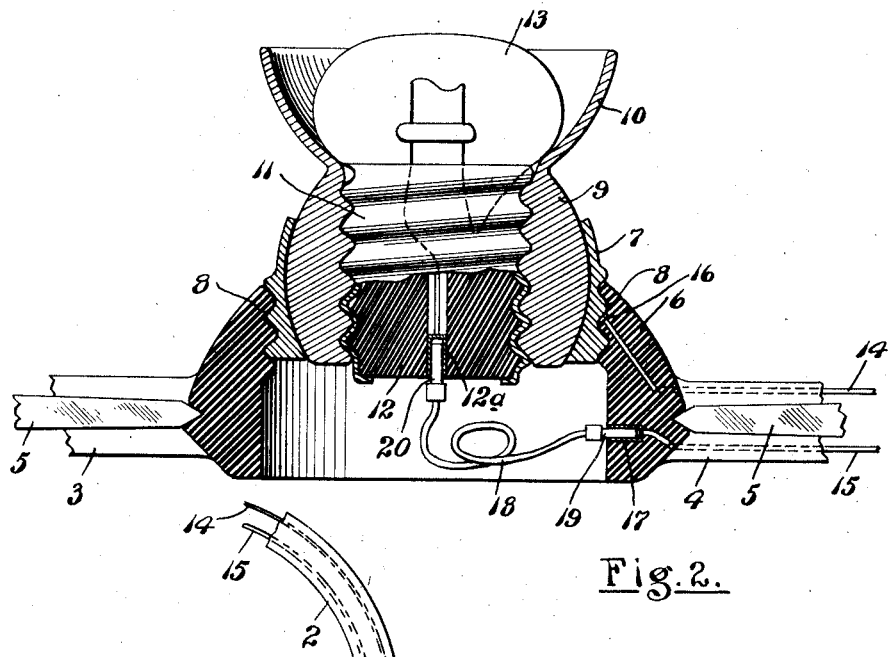
Fig. 2 is a fragmentary enlarged horizontal section through that portion of the spectacle frame where the electric light bulb is mounted.
Figure 3:
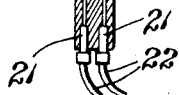
Fig. 3 is a fragmentary enlarged elevation, partly in section, illustrating the manner of connecting a drop cord with the free end of one of the bows of the spectacle frame.

In the bow 2 two wires 14 and 15 are embedded the same extending through the lens holding ring 4 one above and the other below the lens, the wire 14 terminating in a head 16 which bears against the metal member 7, as shown in Fig. 2. The other wire 15 is connected with a socket 17 inserted in the enlarged portion 6 of the bridge of the spectacle frame. A flexible connecting wire 18 which has plugs 19 and 20 at its ends adapted to be inserted in the sockets 17 and 12$^a$ connects wire 15 with the light filament.

At the outer end of the bow 2 in which the wires 14 and 15 are embedded two sockets are proved into which plugs 21 at the ends of a drop cord 22 may be detachably inserted in order to supply the electric light bulb 13 with current, it being evident that the circuit is through wire 15, socket 17, plug 19, wire 18, plug 20 and socket 12$^a$ to the light filament and is thence returned through the shell 11, member 9, member 7 and wire 14.

This construction of electric light for spectacles or the like is relatively simple but is very effective and practical. The material from which the spectacle frame and bows are made is rubber or similar material which is a non-conductor of electricity and the wires 14 and 15 are very easily embedded in the frame at the time it is molded. The member 7 is detachable, thus removing the entire electric light installation very easily, it being understood that the plugs 20 and 19 may be readily removed from their respective sockets 17 and 12ª. Also the electric light is readily removable and may be replaced at any time should it become necessary. The current may be supplied from any socket in a house which is wired for electric lights. This electric light for spectacles is particularly adapted for use by physicians and surgeons but is also useful to many other persons. The invention is defined in the appended claims and is to be considered as comprehensive of all forms of structure coming within their scope.

I claim:

1. In combination, a spectacle frame having lens holding rings connected by a bridge, said bridge having an opening therethrough, a socket member detachably connected with the bridge at said opening, a ball like member mounted for universal movement in said socket member and formed with a reflector at its forward end, an electric light bulb detachably mounted in said ball like member, the bulb being located within said reflector, and means for supplying current to said light bulb.

2. In a construction of the class described, a spectacle frame including lens holding rings and a bridge connecting the same, said bridge having an opening therethrough, a mounting for an electric light bulb mounted for universal movement on said bridge, an electric light bulb provided with a screw threaded shell for screwing into said mounting, circuit wires embedded in one of said rings, one of said wires being electrically connected with said mounting, and detachable means for connecting the other of said wires with the light bulb filament, substantially as described.

3. A device of the class described, comprising a spectacle frame having lens receiving rings and a bridge connecting the same, said bridge having a horizontal opening therethrough, a socket member threaded into the forward end of the said opening in the bridge, a ball-like member mounted for universal movement in said socket member, said ball-like member having a screw threaded opening therethrough and terminating at its outer portion in an outwardly flared reflector, an electric light bulb having a screw threaded shell for threading into the opening in said ball-like member, and means for making electric connections to said light bulb through the frame, substantially as described.

4. A spectacle frame including lens holding rings and a bridge connecting the same, said bridge having a horizontal opening therethrough, an electric light bulb mounted on said bridge at the opening and including a shell and a plug of insulating material in said shell, wires embedded in the spectacle frame, one of the same having electric connection with said shell and the other extending substantially to the edge of said opening through the bridge, and detachable means for making electrical connection between the last named of said wires and the bulb filament, substantially as described.

In testimony whereof I affix my signature.

JACOB BOERMAN.